US012295912B2

(12) United States Patent
Mio et al.

(10) Patent No.: US 12,295,912 B2
(45) Date of Patent: May 13, 2025

(54) PORT-EQUIPPED BAG AND CAP-EQUIPPED BAG

(71) Applicant: Fujimori Kogyo Co., Ltd., Tokyo (JP)

(72) Inventors: Atsushi Mio, Yokohama (JP); Toyoaki Suzuki, Yokohama (JP); Junpei Nomura, Yokohama (JP); Kaho Toyabe, Yokohama (JP)

(73) Assignee: ZACROS Corporation, Tokyo (JP)

( * ) Notice: Subject to any disclaimer, the term of this patent is extended or adjusted under 35 U.S.C. 154(b) by 171 days.

(21) Appl. No.: 16/769,936

(22) PCT Filed: Dec. 5, 2018

(86) PCT No.: PCT/JP2018/044695
§ 371 (c)(1),
(2) Date: Jun. 4, 2020

(87) PCT Pub. No.: WO2019/111938
PCT Pub. Date: Jun. 13, 2019

(65) Prior Publication Data

US 2020/0397657 A1 Dec. 24, 2020

(30) Foreign Application Priority Data

Dec. 7, 2017 (JP) ................................ 2017-235604

(51) Int. Cl.
*A61J 1/14* (2023.01)
*A61J 1/12* (2006.01)
*A61J 1/18* (2023.01)

(52) U.S. Cl.
CPC ............... *A61J 1/1475* (2013.01); *A61J 1/12* (2013.01); *A61J 1/1412* (2013.01); *A61J 1/1468* (2015.05); *A61J 1/18* (2013.01)

(58) Field of Classification Search
CPC A61J 1/1412; A61J 1/1425; A61J 1/10; A61J 1/12; A61J 1/1475; A61J 1/1468;
(Continued)

(56) References Cited

U.S. PATENT DOCUMENTS 3,112,045 A * 11/1963 Chapman .................. A61L 2/26
220/231
6,382,442 B1 5/2002 Thibault
(Continued)

FOREIGN PATENT DOCUMENTS

CN 1665723 A 9/2005
CN 101932512 A 12/2010
(Continued)

OTHER PUBLICATIONS

Office Action issued in EP Application No. 18886692.5 dated Aug. 6, 2021.
(Continued)

*Primary Examiner* — Ariana Zimbouski
(74) *Attorney, Agent, or Firm* — Harris Beach Murtha Cullina PLLC

(57) ABSTRACT

A port-equipped bag includes a bag body formed in a bag shape with a sheet, and a cylindrical port member attached to the bag body, and an inner plug and a cap can be attached to the port member. The port member includes an attaching target portion that is covered by the cap in a case in which the cap is attached thereto and an annular lip protruding outward from the port member. The lip has an annular engagement surface facing the bag body, and the engagement surface has an angle of 45° to 135° with respect to an outer peripheral surface of the attaching target portion in a cross section in an axial direction of the attaching target portion.

7 Claims, 5 Drawing Sheets

(58) Field of Classification Search
CPC A61J 1/18; B65D 51/18; B65D 51/20; B65D 51/002
See application file for complete search history.

(56) References Cited

U.S. PATENT DOCUMENTS

| | | | | | |
|---|---|---|---|---|---|
| 2009/0084804 | A1 | | 4/2009 | Caspary et al. | |
| 2009/0120934 | A1 | | 5/2009 | Domkowski | |
| 2009/0145876 | A1 | * | 6/2009 | Kawamura | B65D 51/002 215/353 |
| 2009/0270830 | A1 | | 10/2009 | Sano | |
| 2011/0024420 | A1 | * | 2/2011 | King | B65D 51/18 220/254.8 |
| 2012/0118894 | A1 | * | 5/2012 | Kawamura | B65D 51/002 220/378 |
| 2014/0126843 | A1 | | 5/2014 | Mochizuki | |
| 2014/0199262 | A1 | | 7/2014 | Hongo et al. | |
| 2015/0298414 | A1 | | 10/2015 | Dittmer et al. | |
| 2016/0280782 | A1 | | 9/2016 | Huang et al. | |
| 2020/0263134 | A1 | * | 8/2020 | Peled | A61K 39/4613 |

FOREIGN PATENT DOCUMENTS

| | | | | | |
|---|---|---|---|---|---|
| CN | 102666299 | A | | 9/2012 | |
| DE | 102009019503 | A1 | | 10/2010 | |
| EP | 1368238 | B1 | † | 5/2014 | |
| EP | 2725033 | B1 | † | 8/2017 | |
| EP | 3248584 | A1 | | 11/2017 | |
| JP | 07133290 | A | | 5/1995 | |
| JP | H07-133290 | A | † | 5/1995 | |
| JP | 09238998 | A | | 9/1997 | |
| JP | 1179227 | A | | 3/1999 | |
| JP | H11-79227 | A | † | 3/1999 | |
| JP | 11164873 | A | | 6/1999 | |
| JP | 2001112848 | A | | 4/2001 | |
| JP | 2006022117 | | * | 1/2006 | |
| JP | 2007282891 | A | | 11/2007 | |
| JP | 2008222270 | A | | 9/2008 | |
| JP | 2008273631 | A | | 11/2008 | |
| JP | 2009132431 | A | | 6/2009 | |
| JP | 2009285457 | A | | 12/2009 | |
| JP | 4450507 | B2 | * | 4/2010 | A61J 1/1406 |
| JP | 2010-233853 | A | † | 10/2010 | |
| JP | 2010279624 | A | | 12/2010 | |
| JP | 2011-093586 | A | † | 5/2011 | |
| JP | 2014065531 | A | | 4/2014 | |
| JP | 5594888 | B | | 9/2014 | |
| JP | 5594888 | B2 | † | 9/2014 | |
| JP | 2014208772 | A | * | 11/2014 | |
| JP | 5711369 | B2 | | 4/2015 | |
| JP | 2015227064 | A | * | 12/2015 | |
| JP | 5913835 | B2 | † | 4/2016 | |
| JP | 2016539125 | A | | 12/2016 | |
| JP | WO2016/117580 | A1 | † | 10/2017 | |
| JP | 6522436 | B2 | * | 5/2019 | |
| KR | 20090057271 | | * | 6/2009 | |
| WO | WO-2013054824 | A1 | * | 4/2013 | A61J 1/10 |
| WO | WO-2014188128 | A1 | * | 11/2014 | A61J 1/1406 |
| WO | 2015002768 | A1 | | 2/2015 | |
| WO | WO2015/077582 | A1 | † | 5/2015 | |
| WO | 2016117580 | A1 | | 7/2016 | |

OTHER PUBLICATIONS

Office Action issued in EP Application No. 18886692.5 dated May 17, 2021.
International Search Report for PCT/JP2018/044695 dated Feb. 19, 2019 with English Translation (3 pages).
Ministry of Health, Labour and Welfare, Pharmaceutical and Food Administration, Surveillance Guidance and Drug counter, Office Contact on Apr. 20, 2011 (87 pages).
PIC/S, The Pharmaceutical Inspection Convention and Pharmaceutical Inspection Cooperation Scheme, GMP Annex1, 2010 (11 pages).
National Intellectual Property Administration, PRC Office Action in Application No. 201880078149.8 dated Oct. 31, 2022.
National Intellectual Property Administration, PRC Office Action for Application No. 201880078149.8 dated May 20, 2023.
Plastic Application Technology, Hao Ding et al. Chemical Industry Press, pp. 318-319, Jan. 31, 1999 (see English translation of Chinese search report for explanation of relevance).
Decision of Rejection from Chinese Patent Office for Application No. 201880078149.8 dated Mar. 21, 2024. (English translation of Search Report only).
Notice of Reasons for Rejection for Japanese Application No. 2023-013301 dated Jan. 16, 2024 with English Translation.

* cited by examiner
† cited by third party

PORT-EQUIPPED BAG AND CAP-EQUIPPED BAG

FIELD OF THE INVENTION

The present invention relates to a port-equipped bag in which a bag body is provided with a port as an inlet or outlet for contents, and a cap-equipped bag in which the bag body is further provided with an inner plug that blocks the opening of the port and a cap that engages with the port and presses the inner plug, and is particularly suitable for aseptic filling with biopharmaceuticals and the like.

Priority is claimed on Japanese Patent Application No. 2017-235604, filed Dec. 7, 2017, the content of which is incorporated herein by reference.

BACKGROUND OF THE INVENTION

An infusion solution bag made of synthetic resin is widely used as a container for accommodating a liquid medicine such as an injection. The infusion solution bag has a bag body (a pouch portion) that accommodates a liquid such as a liquid medicine, and a port for filling or discharging a liquid into or from the bag body, and the port is formed by joining a cylindrical port member made of synthetic resin to the bag body in a state in which the port member penetrates a part of the bag body.

When the port-equipped bag is filled with a liquid, a nozzle of a liquid supply source is inserted into the port and a liquid medicine is injected into the bag body through the nozzle by a machine or an operator. After the filling is completed, it is common to close the opening of the port with a rubber inner plug, to attach a cap covering the inner plug to the port, and to fusion-dose a boundary between the port and the cap.

In the related art, in a case in which the cap is fusion-closed, a method in which an opening end of the port and a top plate portion of the cap are heated with radiant heat from an electric heater and then the two are cooled by pressure-bonding, or a method in which the port is covered with the cap and then a horn is pressed against the top plate portion of the cap while the horn generates ultrasonic oscillation so that a "rib" formed on the cap is melted to integrate the cap with the port, is commonly used. Such fusion-closing is essential to prevent the cap from coming off at the time of heat-sterilization, transportation, and storage of the infusion solution bag, as well as to ensure hermeticity of the bag and to prevent contamination of pharmaceuticals and invasion of bacteria.

After the cap is fusion-closed, the infusion solution bag is sterilized by heating with pressurized steam or hot water to sterilize a liquid medicine filled into the infusion solution bag. This is a standard procedure defined for manufacturing aseptic pharmaceuticals by a final sterilization method.

Incidentally, in recent years, "biopharmaceuticals" as novel pharmaceuticals have become widespread. Biopharmaceuticals are mostly derived from, for example, proteins and substances produced by organisms such as mammalian cells, viruses, and bacteria. These type of biopharmaceuticals have a complicated molecular structure, unlike "small molecule pharmaceuticals" that are manufactured by chemical synthesis of the related art, and their structures can change due to various causes such as heating during a manufacturing process thereof, and thus safety or effectiveness may decrease.

Therefore, regarding the sterilization of biopharmaceuticals, there are many cases in which the final sterilization method by heating cannot be adopted, and in these cases, an "aseptic operation method" in which a series of processes such as manufacturing of a drug substance, formulation, filling, and sealing are executed in an aseptic environment is used. Typical pharmaceuticals manufactured by an aseptic operation method include, for example, component preparations that are manufactured by centrifuging blood to be used for blood transfusion, and plasma fractionated preparations obtained by purifying therapeutically useful proteins of plasma components.

Filling the container with the pharmaceuticals by an aseptic operation method has to be performed in an aseptic operation area such as a clean booth, a restricted access barrier system (RABS), or an isolator, which is isolated from the operator. In recent years, a filling operation in an isolator that can be completely physically isolated from the environment and without direct personnel intervention has become mainstream.

In a case in which an isolator is used, it is necessary to decontaminate the inside of the isolator and then supply air filtered by a HEPA filter or an ULPA filter to prevent contamination from the outside environment. The decontamination is performed by spraying a disinfectant or a cleaning agent including components such as high-concentration hydrogen peroxide, peracetic acid, and formaldehyde into the isolator. Since these chemical substances have strong oxidizing properties and are corrosive and irritative to the skin, it is necessary to pay attention to corrosion of equipment installed in the isolator and the residue after decontamination work.

The above-mentioned operation is an important process for assuring the quality of pharmaceuticals manufactured by an aseptic operation method, and an implementation procedure and management of the process are determined by guidelines such as those in Non-Patent Document 1 and Non-Patent Document 2, for example.

Incidentally, in an aseptic area, it is difficult to perform a fusion-closing operation of a port-equipped bag as described above. This is because a structure and a material of the equipment used for the fusion-closing work are obstacles in the decontamination operation. In addition, the disinfectant and the cleaning agent used for decontamination may remain on the equipment used for the fusion-dosing work. Therefore, there is a demand for a sealing method instead of fusion-closing.

On the other hand, a vial is widely used as a pharmaceutical container to which the aseptic operation method can be applied and which does not need to be fusion-dosed. As a vial, two types of vials, for example, a glass vial and a synthetic resin vial are used. A glass vial has much better gas barrier properties than a synthetic resin vial, and is used as a medicine container that requires excellent gas barrier properties.

In a case in which a vial is filled with a medicine, an opening of the vial is sealed with a rubber plug or the like. Similar to a port-equipped bag, simply fitting a rubber plug to a vial opening is not sufficient as a sealing method, and thus it is common to attach an aluminum cap that covers the rubber plug, to roll seam a lower end of this cap with a seaming roller, and to fit the lower end of the cap to a lip of the port (Patent Document 1).

An aluminum cap is readily deformed but has excellent detachment preventability. However, aluminum caps have the problem that during manufacture and use thereof, aluminum particles are likely to be generated and scattered due to collision between caps and the operation of a seaming roller, and it is difficult to separate off and discard the caps after using the vials. Therefore, in recent years, the use of aluminum caps has been avoided in pharmaceutical applications.

In particular, in an aseptic operation method environment, it is necessary to work in an isolated space to prevent external contamination, and thus care must be taken that the cleanliness in the controlled area is not reduced. Non-Patent Document 1 also stipulates that "the seaming roller of the aluminum cap is a facility that generates a large amount of dust, so that the seaming roller has to be installed in a partitioned off place equipped with an appropriate exhaust system", and thus the aluminum cap has problems such as complication of the facility and reduced workability.

Further, a glass vial container is self-supporting and therefore has excellent handleability during storage and preparation, but has poor flexibility. Therefore, when a glass vial container is used as is for a drip, the pressure inside the container decreases in accordance with the amount of infusion solution in the container decreasing as the drip progresses, and the drip rate decreases. In this way, if the drip rate decreases as the drip progresses, the time required for the drip increases. Furthermore, since it is difficult to predict the end time of the drip, it is necessary to check the drip situation at any time in a case in which the drip is performed a plurality of times, and drip treatment becomes complicated.

Therefore, in a case of direct administration from the vial container, an aerating needle for introducing air from the outside into the container is inserted into the container to make the drip rate constant.

However, it is difficult to keep the drip rate constant even when the aerating needle is used, and the use of the aerating needle may contaminate the infusion solution.

Instead of the glass vial container, for example, in Patent Document 2, use of an infusion solution bag using a flexible film is also considered. This type of infusion solution bag has excellent flexibility and since the bag deflates as the volume of infusion solution decreases, there are thus advantages that the drip rate is unlikely to decrease even without using an aerating needle and an infusion solution pump for keeping an administration rate constant is not necessary.

Patent Document 3 discloses a method of filling an infusion solution bag with albumin preparations. In this method, an unwound roll film is sterilized by passing through a sterilization section, and then passes through a drying section, an assembly section of a seal and a port member, a filling section, and an end sealing/cutting section to complete an infusion solution bag. However, in this method, most of complicated FFS (Form-Fill-Seal) apparatuses need to be sterilized and it is difficult to completely remove the above-described disinfectant and cleaning agent, and thus the method is not preferable in terms of management.

CITATION LIST

Patent Literature

[Patent Document 1]
Japanese Unexamined Patent Application, First Publication No. 2007-282891
[Patent Document 2]
Japanese Unexamined Patent Application, First Publication No. 2010-279624
[Patent Document 3]
Japanese Unexamined Patent Application, First Publication No. 2008-273631

Non-Patent Document

[Non-Patent Document 1]
Pharmaceutical Inspection Convention and Pharmaceutical Inspection Co-operation Scheme GMP Annex 1
[Non-Patent Document 2]
Apr. 20, 2011, Announcements of Compliance and Narcotics Division, Pharmaceutical and Food Safety Bureau, Ministry of Health, Labour and Welfare

SUMMARY OF THE INVENTION

Technical Problem

As described above, the infusion solution bag of the related art is effective as a container for pharmaceuticals that cannot be heat-sterilized, but there are many restrictions in terms of manufacture, and the spread of bag preparations manufactured by the aseptic operation method is limited.

The present invention has been made in view of the above circumstances and an object thereof is to provide a port-equipped bag and a cap-equipped bag that can be sealed without using a complicated sealing apparatus or method, for example, even in an aseptic environment and can more easily realize an aseptic state.

Solution to Problem

A port-equipped bag of the present invention includes a bag body that is formed in a bag shape with a sheet and has an accommodation portion therein; and a cylindrical port member that is attached to the bag body and has one end communicating with the accommodation portion and the other end at which an opening exposed outside the bag is formed, wherein an inner plug and a cap for pressing the inner plug are attachable to the port member, wherein the port member includes an attaching target portion that is covered by the cap in a case in which the cap is attached to the port member and an annular lip that is formed at a peripheral edge of the opening and protrudes outward from the port member, wherein the lip has an annular engagement surface facing the bag body, and wherein the engagement surface has an inclination angle of 45° to 135° with respect to an outer peripheral surface of the attaching target portion in a cross section in an axial direction of the attaching target portion. The inclination angle is more preferably 60° to 120°, further preferably 90° to 105°.

The port member may be formed of a material having a bending elastic modulus of 140 MPa or more. The port-equipped bag may be sterilized.

The bag body may have a rectangular shape, a length in a major axis direction of 80 to 400 mm, a width in a minor axis direction of 60 to 350 mm, and a filling amount of contents of 20 to 1000 mL.

A hydrophilic group or a lipophilic group may be provided on a surface of the sheet on an inner surface side of the bag to protect a medicinal component.

The tensile elastic modulus of the sheet may be 1500 MPa or less, or may be 50 to 550 MPa.

The thickness of the sheet may be 100 to 400 μm, may be 150 to 300 μm, or may be 180 to 270 μm.

A product (M×T) of the tensile elastic modulus M (MPa) and the sheet thickness T (μm) of the sheet may be 20,000 or more and 300,000 or less, may be 30,000 or more and 250,000 or less, or may be 35,000 or more and 200,000 or less. The tensile elastic modulus M can be measured by a measuring method specified in ISO 527-1.

In the port-equipped bag, a sterility assurance level (SAL) may be $10^{-6}$ or less due to a high temperature sterilization treatment, ultraviolet sterilization treatment, or radiation sterilization treatment using a gamma radiation and the like.

Regarding dimensions of the port member, an outer diameter excluding a convex portion may be 10 to 20 mm, a wall thickness may be 0.5 to 5 mm, and a length may be 30 to 50 mm.

The height of a flange portion from a surface of the port member may be about 30% to 150% of the height of an outer peripheral surface of the cap when the cap is attached thereto.

The protrusion height of the lip from the attaching target portion may be 0.5 to 5 mm or may be 1 to 3 mm. A tip end width of the lip may be 1 to 10 mm or may be 3 to 6 mm.

The port member may have a bending elastic modulus of 200 MPa or more, and may have a bending elastic modulus of 400 to 2000 MPa. The port member may be formed of polyethylene, polypropylene, or a cyclic polyolefin.

The maximum depressing force to the cap until the engagement piece is elastically deformed and passes over the lip due to depressing the cap while covering the port member may be 10 to 200 N. The distance from a tip end of a tip end portion in a free state of the engagement piece to a central axis of the cap may be 95% to 105% of the distance from the outer peripheral surface of the attaching target portion to a central axis of the port member.

A cap-equipped bag of the present invention includes the port-equipped bag; and an inner plug and a cap for pressing the inner plug that are attachable to the port member, wherein the cap includes a top plate portion, a cylindrical skirt portion that stands upright from a periphery of the top plate portion to be able to cover the attaching target portion, and a plurality of engagement pieces provided at a lower end portion of an inner surface of the skirt portion, wherein the engagement piece has a tip end portion that protrudes toward the top plate portion and is elastically accessible to an inner peripheral surface of the skirt portion, and wherein in a case in which the cap is attached to the port member, the tip end portion of the engagement piece comes into contact with the engagement surface of the lip to be engageable with the engagement surface.

An opening may be formed in the top plate portion of the cap, and a seal that closes the opening may be detachably fixed to the top plate portion, so that the opening can be exposed by detaching the seal.

In the cap-equipped bag according to another aspect of the present invention, the accommodation portion of the bag body is aseptically filled with contents containing at least one selected from the group consisting of plasma fractionated preparations such as albumin preparations or globulin preparations, enzymes, blood coagulation fibrinolytic system factors, hormones, vaccines, interferons, erythropoietins, cytokines, antibodies, and fusion proteins, and the cap is attached to the port member to seal the contents.

Advantageous Effects of Invention

According to the port-equipped bag and the cap-equipped bag of the present invention, by pressing the inner plug and the cap that presses the inner plug while covering an opening of the port, the plurality of engagement pieces provided at the lower end portion of the inner surface of the skirt portion are elastically deformed to pass over the lip, and the tip end portion of the engagement piece comes into contact with the engagement surface of the lip and engages with the engagement surface. Therefore, the port-equipped bag and the cap-equipped bag according to the present invention can be used without hindering sterilization work in an aseptic operation area, for example, because a special apparatus for attaching the cap is not necessary and cap attachment is easy, and are highly reliable in terms of maintaining an aseptic state because the cap is securely fixed to the lip by elasticity of the engagement piece after being attached. In addition, the port-equipped bag and the cap-equipped bag according to the present invention have an effect that a discharging speed of the contents can be made constant without using the aerating needle at the time of use.

DETAILED DESCRIPTION OF THE INVENTION

Figure 1:
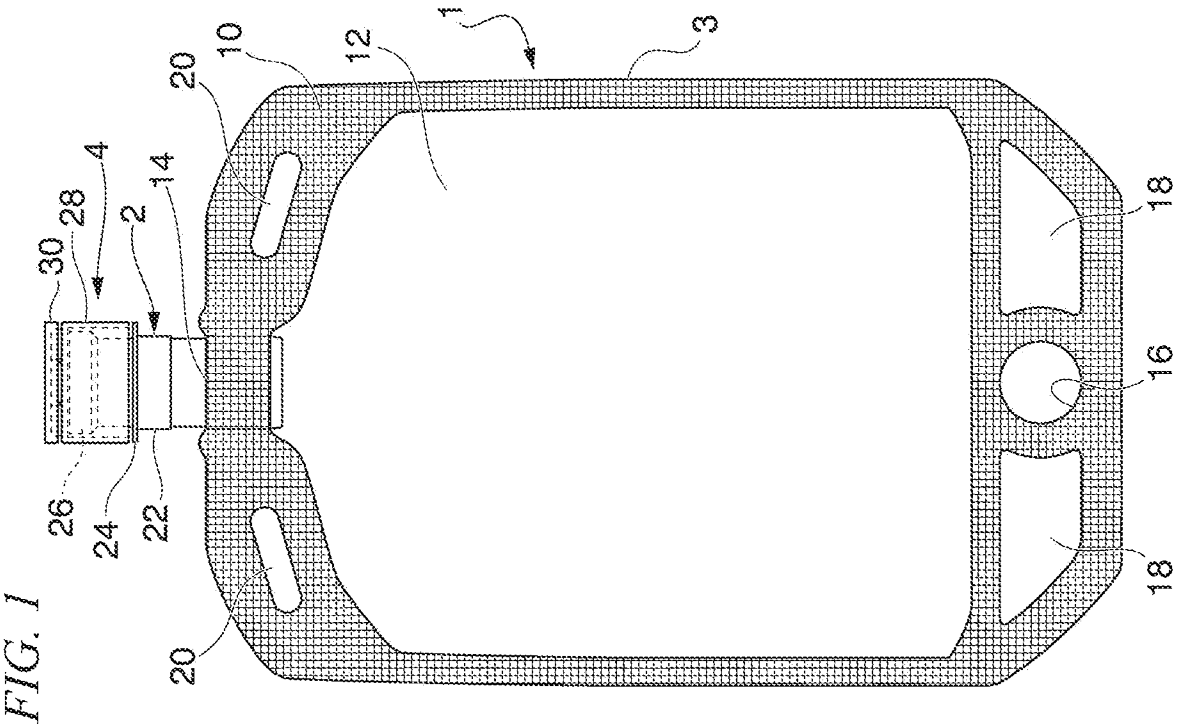
FIG. 1 is a front view of a cap-equipped bag according to a first embodiment of the present invention.
Figure 2:
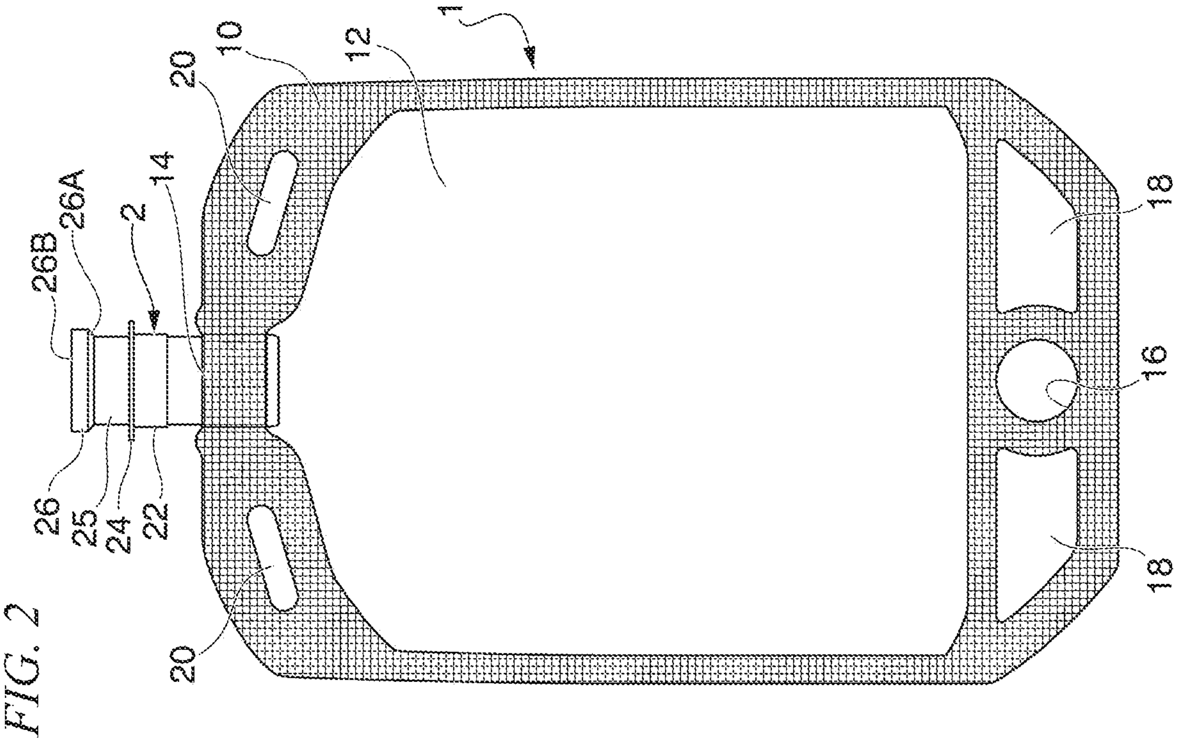
FIG. 2 is a front view of a port-equipped bag according to the first embodiment.

Hereinafter, embodiments of the present invention will be described in detail with reference to the drawings. FIG. 1 is a plan view showing a cap-equipped bag according to an embodiment of the present invention, and the cap-equipped bag includes a port-equipped bag 1, an inner plug 50 (refer to FIG. 7), and a cap 4. FIG. 2 is a plan view showing only the port-equipped bag 1 from which the cap 4 and the inner plug 50 are removed. In the following description, the port is directed upward for easy understanding, but the port-equipped bag and the cap-equipped bag of the present invention may be used in any posture without being fixed in this direction.

The port-equipped bag 1 includes a rectangular bag body 3 having an accommodation portion 12 capable of containing an accommodation object therein, and a cylindrical port member 2 fixed to an opening 14 formed at a central portion of one end of the bag body 3 by being inserted into the opening. In the bag body 3, outer peripheral portions of two rectangular resin sheets are bonded or heat-sealed to be joined to each other, a seal portion 10 is formed over the entire peripheral edge except for the opening 14, and the accommodation portion 12 is formed inside the seal portion. A circular hole 16 is formed in the seal portion 10 at an end portion of the bag body 3 opposite to the opening 14. Non-seal portions 18 are formed on both sides of the hole 16 and non-seal portions 20 are formed also on both sides of the opening 14, and thus the non-seal portions 18 and 20 make a seal width of each portion substantially constant.

The bag body 3 is not limited to the shown shape, and may have any shape as long as it has a bag shape. For example, the bag body may be formed in a manner in which one sheet is folded in half, a center fold line is used as a bottom of the bag body 3, and other portions are joined to each other, or m may be formed in a manner in which the sheet is rolled into a tubular shape, and both ends and sticking surfaces are joined. The sheet may be formed in a three-dimensional box shape. Also, if the sheet is formed in a box shape or a tubular shape, the bag body 3 can maintain flexibility.

Dimensions of the bag body 3 are not limited in the present invention, but if a length in a major axis direction is about 80 to 400 mm, a width in a minor axis direction is about 60 to 350 mm, and a filling amount of contents is about 20 to 1000 mL, the bag is suitable as an infusion solution bag for pharmaceuticals or the like.

A material of the sheet is not limited in the present invention, but it is possible to use a laminate having a sealant on at least one side thereof, for example, a laminate film in which a polyolefin resin layer formed of polyethylene (PE), polypropylene (PP), an ethylene-vinyl acetate copolymer (EVA), a cyclic polyolefin, or the like is used as the innermost layer with the sealant facing inward, a stretched film such as a biaxially stretched nylon film, a biaxially stretched polyethylene terephthalate film, and a biaxially stretched polypropylene film is used as a base material, and if necessary, an intermediate layer such as a vapor deposition layer formed of an ethylene-vinyl alcohol copolymer, a metal or an inorganic compound, and a metal foil such as an aluminum foil is provided between the innermost layer and the base material. The sheets may be the same or different in material and thickness as long as they can be joined to each other by welding or bonding. A film having high barrier properties against water vapor or oxygen gas that is commonly used can be also used as the sheet. In addition, the sheet may have an alteration preventing ability for preventing alteration of liquid contents due to permeation or adsorption of an active ingredient of an inner solution or elution of a low molecular weight component contained in the resin constituting the sheet itself. For example, a hydrophilic group or a lipophilic group capable of protecting a medicinal component can be provided on a surface of the sheet on an inner surface side of the bag depending on the medicinal component of preparations to be accommodated.

For example, from a viewpoint that the bag body 3 is appropriately deflated as the contents decrease and a supply rate at the time of the drip is kept constant, it is preferable that the bag body 3 is highly flexible within a range in which problems are not caused in manufacture and use. Therefore, a tensile elastic modulus M (MPa) of the sheet forming the bag body 3 is not limited, but is preferably 1500 MPa or less, more preferably 50 to 550 MPa. A thickness T (μm) of the sheet is not limited, but is preferably 100 to 400 μm, more preferably 150 to 300 μm, and further preferably 180 to 270 μm. In a case in which the tensile elastic modulus M is too small or the thickness T of the sheet is too small, the sheet is likely to stretch during manufacture, which makes manufacture difficult. In a case in which the tensile elastic modulus M is too large or the thickness T of the sheet is too large, the bag body 3 becomes inflexible, and thus it is difficult to keep the drip rate constant. A product (M×T) of the tensile elastic modulus M (MPa) and the sheet thickness T (μm) is preferably 20,000 or more and 300,000 or less, more preferably 30,000 or more and 250,000 or less, and further preferably 35,000 or more and 200,000 or less. The tensile elastic modulus M of the sheet can be measured by a measuring method specified in ISO 527-1.

In a case in which the port-equipped bag 1 is used as an infusion solution bag for pharmaceuticals, an inner surface of the port-equipped bag 1, that is, at least an inner surface of each of the bag body 3 and the port member 2 is preferably sterilized. In the sterilization, it is preferable to set a sterility assurance level (SAL) to 10- or less by a method such as high temperature sterilization treatment, ultraviolet sterilization treatment, and radiation sterilization treatment using a gamma radiation and the like. Similarly, the cap 4 and the inner plug 50 are sterilized. The sterilization has to be performed at least on the inner surface of the bag, but practically, in a state in which the entire bag including the cap 4 and the inner plug 50 is enclosed in an outer bag, the bag is sterilized by the above-mentioned means. At the time of use, for example, the outer bag is opened in an aseptic chamber, the contents are injected into the port-equipped bag 1, and the inner plug 50 and the cap 4 are attached to the bag for use.

Figure 3:
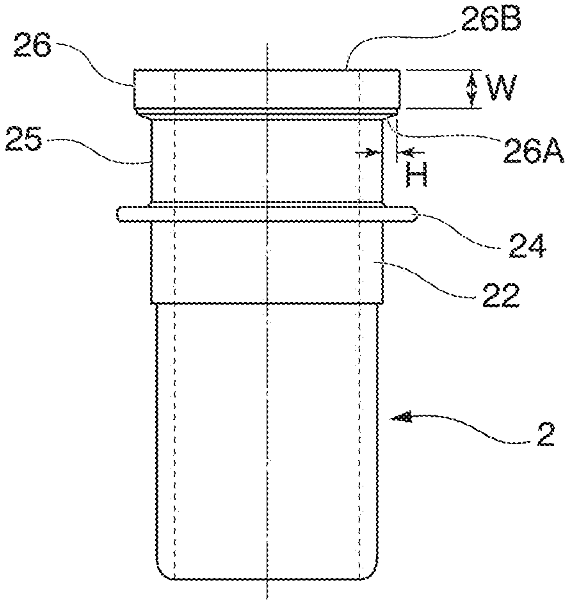
FIG. 3 is a front view of a port member used in the first embodiment.

As shown in FIG. 3, the port member 2 has a cylindrical shape, and in a state in which a base end portion of the port member is inserted into the opening 14 of the bag body 3, the base end portion is joined to the sheet on both sides with no gap by bonding or heat sealing. Dimensions of the port member 2 are not limited in the present invention, but as an example, if an outer diameter excluding a convex portion is about 10 to 20 mm, a wall thickness is about 0.5 to 5 mm, and a length is about 30 to 50 mm, it is suitable as an infusion solution bag for pharmaceuticals.

An annular lip 26 that protrudes outward from the port member 2 is formed coaxially with the port member 2 at a peripheral edge of a tip end opening of the port member 2. A circle-annular flange portion 24 having a constant width is formed on an outer peripheral surface of the port member 2 at a constant distance from the lip 26, and in a case in which the cap 4 is attached to the port member 2, an opening end of the cap 4 and the flange portion 24 face each other with a slight gap. The height of the flange portion 24 from a surface of the port member 2 is about 30% to 150% of the height of an outer peripheral surface of the cap 4 when the cap 4 is attached to the port member. The flange portion 24 prevents a lower end of the cap 4 from being pushed up and the cap 4 from accidentally coming off. Here, the flange portion 24 may not be formed on the port member 2.

An attaching target portion 25 having a constant width that is covered with the cap 4 in a case in which the cap 4 is attached to the port member 2, is formed between the lip 26 and the flange portion 24. Although the port member 2 is linear in this embodiment, a configuration in which the attaching target portion 25 is bent with respect to a body of the port member 2 is also possible if necessary.

Figure 4:
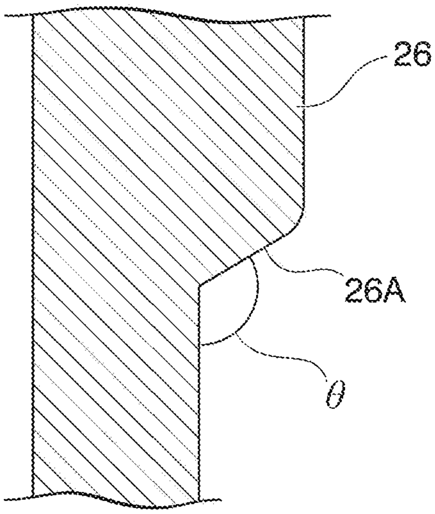
FIG. 4 is an enlarged cross-sectional view of a lip of the port member.

The lip 26 has an annular engagement surface 26A facing the bag body 3. The engagement surface 26A has a constant width over the entire periphery and has an inclination angle θ of 45° to 135° with respect to an outer peripheral surface of the attaching target portion 25 in a cross section in an axial direction of the attaching target portion 25 as shown in FIG. 4. The inclination angle θ is more preferably 60° to 120°, further preferably 90° to 105°. In a case in which the inclination angle is 90° or less, the engagement surface 26A is in an overhung state. Even the overhang shape can be manufactured by devising a mold structure. In a case in which the inclination angle θ is large, the cap 4 is likely to come off the port member 2 when a seal 30 (see FIGS. 1, 5, and 6) provided on an upper surface of the cap 4 is removed.

In a case in which the inclination angle θ is too small, the cap 4 has a high locking performance, but a mold structure for injection molding the port member 2 is limited, and the productivity is reduced. To prevent the cap 4 from coming off and to improve the productivity of the port member 2, the inclination angle θ is preferably in the above range. The engagement surface 26A may be rounded in the cross section or the inclination angle may be partially changed, but the inclination angle of the region with which an engagement piece 32 comes into contact desirably satisfies the above range.

Figure 9:
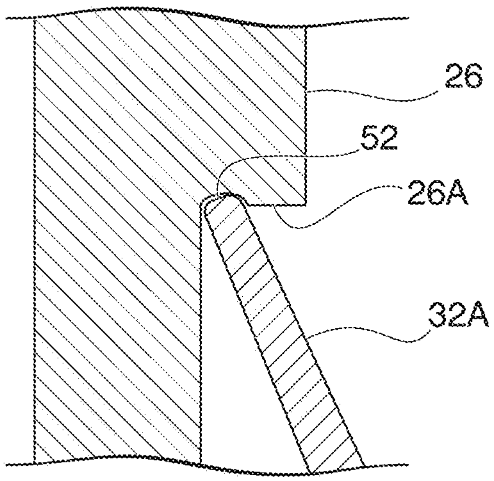
FIG. 9 is an enlarged cross-sectional view showing a state in which an engagement piece engages with a lip according to another embodiment of the present invention.

As shown in FIG. 9, a groove 52 that extends over the entire periphery of the engagement surface 26A and has a constant depth is formed in a region of the engagement surface 26A with which the engagement piece 32 comes into contact, and a tip end portion 32A of the engagement piece 32 may enter the groove 52. In this case, a force for locking the engagement piece 32 increases more than a case in which the engagement surface 26A is simply a flat surface. The inclination angle θ of the engagement surface 26A is defined as an inclination angle of a portion on which the tip end portion 32A abuts, and in a case in which contacting is each generated at a plurality of portions, the inclination angle is defined as an average value thereof. In an example shown in FIG. 9, a groove 52 having a shallow arc-shaped cross section is formed in a portion of the engagement surface 26A near the attaching target portion 25, but the location and the shape are not limited, and a groove 52 having a rectangular cross section may be formed in a central portion of the engagement surface 26A.

A protrusion height H of the lip 26 shown in FIG. 3 from the attaching target portion 25 is not limited in the present invention, but is preferably 0.5 to 5 mm, and more preferably 1 to 3 mm. In addition, a tip end width W of the lip 26 is not limited in the present invention, but is preferably 1 to 10 mm, more preferably 3 to 6 mm. The groove may be formed in an outer peripheral surface of the lip 26 over the entire length of the lip, and in this case, the groove has an advantage of suppressing a decrease in shape accuracy due to shrinkage during molding, but as the groove is formed, the strength of the lip 26 decreases.

For example, one or a plurality of notches (not shown) may be formed in the lip 26 at intervals in a peripheral direction, and even in this case, the "annular" condition is satisfied. The width of the notch in the peripheral direction of the lip needs to be smaller than a width of the tip end portion 32A of the engagement piece 32 in a peripheral direction of the cap. The lip 26 may not be a complete circle-annulus, and may have, for example, a polygonal shape whose outer peripheral surface is formed of a large number of flat surfaces as long as a width required for the engagement surface 26A can be secured, and even in this case, a condition of "annular" is satisfied. That is, the term "annular" is not limited to a circle-annular shape, and some shape changes are allowed as long as a sealing function equivalent to that of the circle-annular shape can be achieved.

Figure 7:
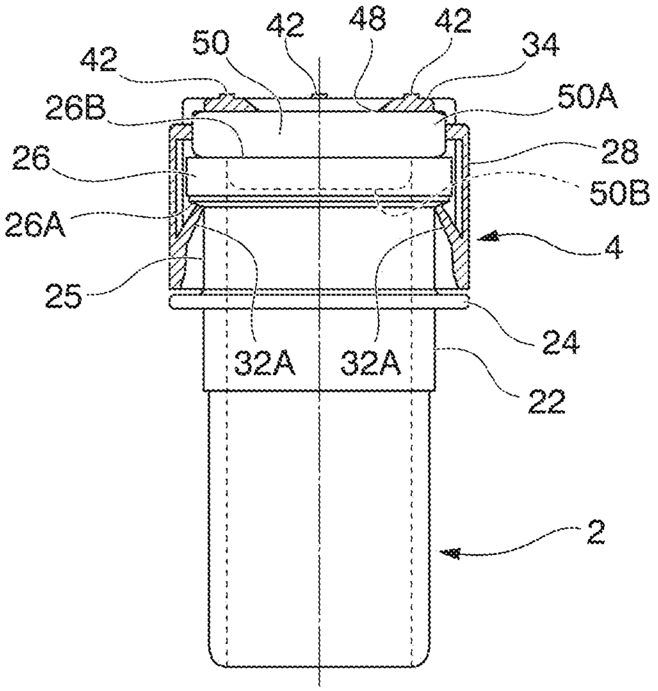
FIG. 7 is a partially cutaway front view showing a state in which the cap is attached to the port member according to the first embodiment.
Figure 8:
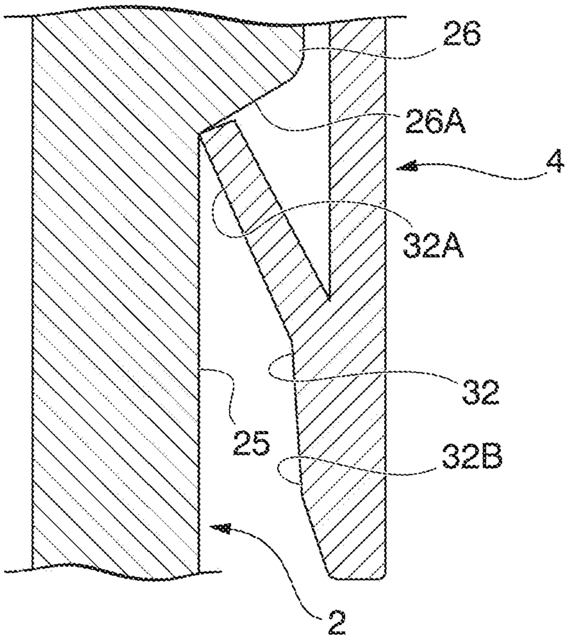
FIG. 8 is an enlarged cross-sectional view showing a state in which an engagement piece engages with the lip according to the first embodiment.

The port member 2 is preferably formed of a material having a bending elastic modulus of 140 MPa or more. As a material that satisfies this condition, synthetic resin such as polyethylene, polypropylene, and a cyclic polyolefin is an exemplary example, which can be appropriately selected according to a material of the bag body 3. In a case in which a material that has high flexibility and is likely to be deformed by applying a force is used, the cap 4 may come off when the seal 30 of the cap 4 is removed even if the inclination angle θ of the engagement surface 26A is appropriate. Therefore, the bending elastic modulus is preferably 140 MPa or more. The bending elastic modulus is more preferably 200 MPa or more, and further preferably 400 to 2000 MPa. The bending elastic modulus can be measured by a measuring method specified in ISO 178. FIG. 7 shows a state in which the seal 30 is removed from the cap 4.

Figure 5:
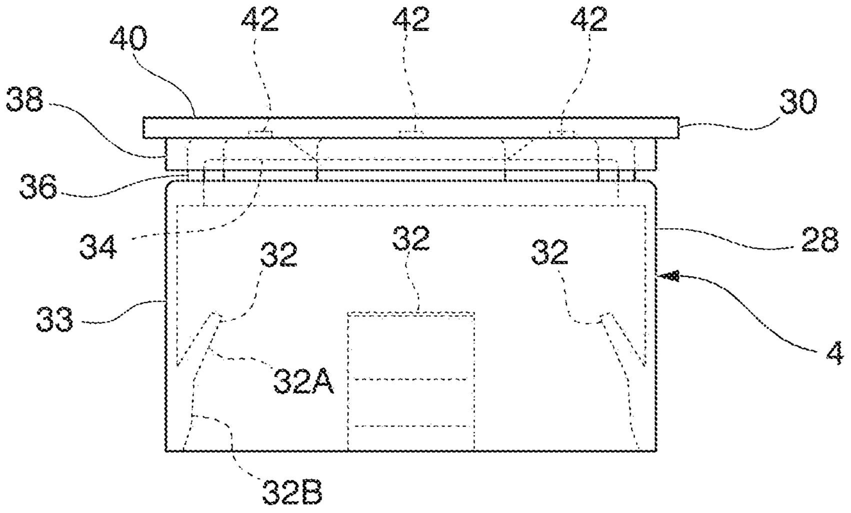
FIG. 5 is a front view of a cap according to the first embodiment.
Figure 6:
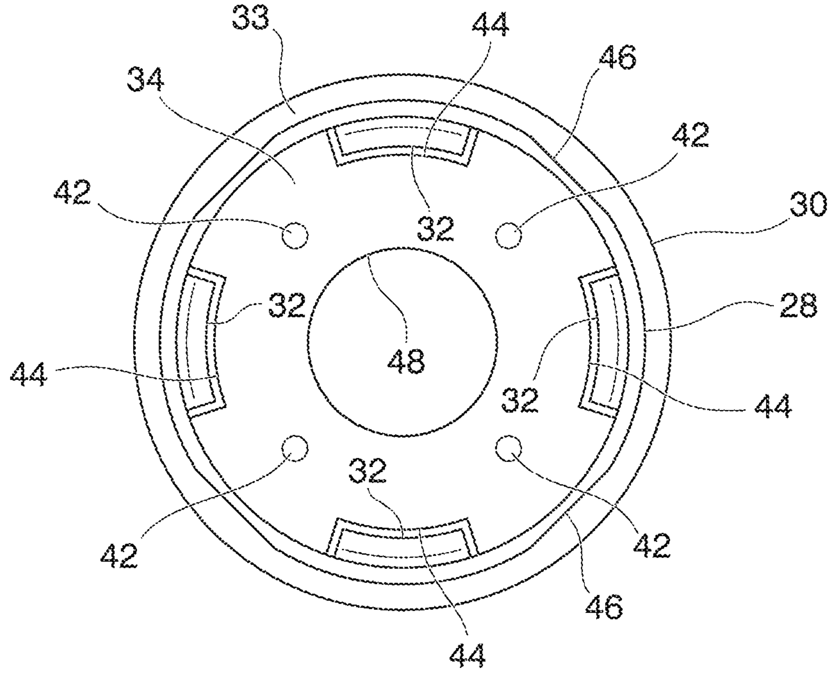
FIG. 6 is a bottom view of the cap according to the first embodiment.

As shown in FIG. 5 and FIG. 6 (a bottom view), the cap 4 has a cap body 28 and the seal 30 fixed on the cap body 28, and by lifting a peripheral edge of the seal 30 with the finger, the seal 30 comes off the cap body 28.

The cap body 28 includes a disc-shaped top plate portion 34, a cylindrical skirt portion 33 extending vertically from a periphery of the top plate portion 34, and a plurality of (four in this embodiment) engagement pieces 32 provided at a lower end portion of an inner surface of the skirt portion 33. A recess 46 is formed in an outer peripheral surface of the skirt portion 33 at a position corresponding to a space between the engagement pieces 32 to prevent the hand from slipping. The engagement piece 32 has a rectangular plate shape, and includes a base portion 32B integrally formed with an inner peripheral surface of a lower end of the skirt portion 33, and the tip end portion 32A protruding from the base portion 32B toward the top plate portion 34 in an upper direction inside the cap, and the tip end portion 32A is elastically accessible to an inner peripheral surface of the skirt portion 33.

The distance from a tip end of the tip end portion 32A in a free state of the engagement piece 32 to a central axis of the cap 4 is shorter than the distance from the outer peripheral surface of the lip 26 to a central axis of the port member 2. Meanwhile, the distance from the tip end of the tip end portion 32A in a state in which the engagement piece 32 is elastically deformed and is closest to the inner peripheral surface of the skirt portion 33, to the central axis of the cap 4 is equal to or longer than the distance from the outer peripheral surface of the lip 26 to the central axis of the port member 2. Accordingly, when the cap 4 is depressed while covering the port member 2, the tip end portion 32A of the engagement piece 32 is elastically deformed to pass over the lip 26 and then spreads again to come into contact with the engagement surface 26A of the lip 26 and to engage with the engagement surface. If the maximum depressing force to the cap 4 until the engagement piece 32 is elastically deformed to pass over the lip 26 by depressing the cap 4 while covering the port member 2 is about 10 to 200 N, it is easy for use. The maximum depressing force is more preferably 20 to 100 N. However, in a case in which attachment of the cap 4 is mechanically performed, if the maximum depressing force to the cap 4 is in a range in which the port member 2 and the cap 4 are not plastically deformed, the port member and the cap can be used.

The distance from the tip end of the tip end portion 32A in a free state of the engagement piece 32 to the central axis of the cap 4 is slightly longer than, substantially equal to, or slightly shorter than the distance from the outer peripheral surface of the attaching target portion 25 to the central axis of the port member 2. If the distance is in this range, preferably, the distance from the tip end of the tip end portion 32A in a free state of the engagement piece 32 to the central axis of the cap 4 may be about 95% to 105% of the distance from the outer peripheral surface of the attaching target portion 25 to the central axis of the port member 2.

The number of engagement pieces 32 is not limited, but from a viewpoint of stability of cap fixing, three to six pieces are preferable, and four pieces are the most preferable. It is desirable that the tip end portion 32A of the engagement piece 32 is curved according to a curved shape of the lip 26 to come into contact with the engagement surface 26A over the entire length in a horizontal direction. A rectangular opening 44 is formed in the top plate portion 34 at a position corresponding to each engagement piece 32, and serves as a core escape path for injection molding the overhanging engagement piece 32.

The inner plug 50 that closes an opening of the port is formed of rubber or elastomer having high elasticity, and includes a disc-shaped portion 50A having an outer diameter substantially the same as an upper end of the port member 2 and a convex portion 50B protruding from a center of a lower surface of the disc-shaped portion 50A. An outer diameter of a root of the convex portion 50B is slightly larger than an opening diameter of the port member 2, and when the inner plug 50 is fitted into the port member 2, the convex portion 50B enters an inside of the port member 2 and the disc-shaped portion 50A abuts on an upper surface of the lip 26 of the port member 2. By attaching the cap 4 from above the inner plug 50, the inner plug 50 is compressed by the cap 4, the disc-shaped portion 50A comes into pressure-contact with an upper end surface of the port member 2, and the convex portion 50B swells to come into pressure-contact with an inner surface of the port member 2. Accordingly, the port member 2 is hermetically sealed and keeps an aseptic state.

The inner plug 50 may be integrally coupled with the cap 4 mechanically in advance, may be joined with the cap by bonding or welding, or may be integrally molded with the cap.

The inner plug 50 may have a main body made of rubber or elastomer, and a coating layer formed by coating at least a surface of the main body that is exposed to the contents with fluororesin. A method of forming a coating layer is not limited, and the coating layer may be laminated or may be formed by a spray method.

A circular opening 48 is formed in a center of the top plate portion 34 of the cap 4, and a seal 30 that closes the opening 48 is joined to the top plate portion 34 via a connecting portion 42. An outer diameter of the seal 30 is slightly larger than an outer diameter of the cap 4, and when the peripheral edge of the seal 30 is strongly pulled up, the connecting portion 42 is broken and the seal 30 is detached from the cap body 28. Accordingly, the opening 48 is opened, and the contents of the bag body 3 can be discharged by piercing the inner plug 50 with an injection needle or the like.

The accommodation portion 12 of the bag body 3 can accommodate any substance such as liquid, powder, gas, or a mixture thereof so long as the substance passes through the port member 2, and the present embodiment is particularly suitable for the biopharmaceuticals that cannot be heat-sterilized. As these kinds of pharmaceuticals, at least one selected from the group consisting of plasma fractionated preparations such as albumin preparations or globulin preparations, enzymes, blood coagulation fibrinolytic system factors, hormones, vaccines, interferons, erythropoietins, cytokines, antibodies, and fusion proteins are exemplary examples. In an aseptic environment, the accommodation portion 12 is aseptically filled with the contents including the biopharmaceuticals, the inner plug 50 is fitted into the opening of the port member 2, the cap 4 is attached to the port member 2 and is depressed, and the engagement piece 32 engages with the lip 26, so that the contents can be sealed and stored in an aseptic state. Therefore, unlike the port-equipped bag that needs to be fusion-closed or the vial container in which the aluminum cap needs to be wound/fastened in the related art, it is possible to easily use the port-equipped bag of the present embodiment without hindering sterilization work due to necessity of a special apparatus for sealing or generating fine particles that decrease a clean degree.

To take out the pharmaceuticals from the cap-equipped bag in which the pharmaceuticals are stored, the cap 4 is not removed, and the seal 30 is pulled up to break the connecting portion 42 and the seal 30 is removed from the cap body 28. An injection needle or the like is pierced through the inner plug 50 through the opening 48 and the cap-equipped bag is hung by a hook through the hole 16 of the bag body 3, so that the pharmaceuticals can be discharged through the injection needle and a tube using gravity and the bag body 3 is deflated as the contents are reduced. Therefore, it is not necessary to use the aerating needle like the vial container, and there is no risk of outside air entering the bag through the aerating needle and contaminating the contents.

As described above, according to the port-equipped bag and the cap-equipped bag of the present embodiment, unlike the port-equipped bag that needs the apparatus for fusion-closing or the vial container that needs the aluminum cap seaming roller in the related art, it is possible to easily perform sealing work of the contents and to lower the cost without hindering sterilization work due to necessity of a special apparatus for sealing or generating fine particles that impair the aseptic state. Further, since the bag of the present embodiment is flexible and deflates as the contents are discharged, it is not necessary to use the aerating needle unlike the vial container, and there is no risk of contaminating the contents through the aerating needle. Therefore, the bag of the present embodiment has an advantage of lowering the cost of manufacturing pharmaceuticals and being easy to be used even in the medical field.

EXAMPLES

Hereinafter, exemplary examples of the present invention will be provided with effects thereof being shown, but the present invention is not limited to these examples.

Port-equipped bags of Examples 1 to 4 of the present invention and Comparative Example 1 were made by the following method. A sheet material obtained by forming a film of linear low density polyethylene (LLDPE) polymerized by a metallocene catalyst to be a thickness of 250 μm was prepared, and two sheet materials were joined to each other by heat-sealing to make a bag body. The tensile elastic modulus of the sheet material is 360 MPa as measured by a method of ISO 527-1. The density of the sheet material is 924 kg/m$^2$ as measured by a method described in ISO 1872-1.

A port member was made by injection molding using high density polyethylene (HDPE) having a bending elastic modulus of 1140 MPa and a density of 964 kg/m$^2$. The overall height of the port member is 38.3 mm, an outer diameter of a lip is φ19.7 mm, the inner diameter of the port member is 912.7 mm, the radial thickness of a lip portion from a port inner peripheral surface is 3.8 mm, and the outer diameter of an attaching target portion is 16.6 mm, and an inclination angle θ of an engagement surface between the attaching target portion and the lip is 90°, 105°, 120°, 135° or 150°, in 15° increments.

A port-equipped bag in which the bag body and the port member are combined and heat-sealed, and an inner diameter of an accommodation portion of the bag body is 140 mm×105 mm, the overall length of the bag body and the port member is 196 mm, and the overall width of the bag body is 116 mm was made.

As an inner plug, a butyl rubber plug "product number: S10-F451" manufactured by Daikyo Seiko, Ltd. was used. As a cap, polypropylene "Plascap" (trademark) manufactured by Daikyo Seiko, Ltd., product number "20GD-2" was used.

On the other hand, as Comparative Examples 2 to 6, a port component molded with LLDPE having a bending elastic modulus of 130 MPa and a density of 915 kg/m$^2$ was used, other conditions were the same as those of Examples 1 to 4 and Comparative Example 1, respectively, and a port-equipped bag was made. Table 1 shows a list of materials and port shapes of Examples 1 to 4 and Comparative Examples 1 to 6.

An evaluation test was each performed on Examples 1 to 4 and Comparative Examples 1 to 6 by the following method.

(1) Cap Fixability Test

Each port-equipped bag was filled with 100 mL of water colored by dissolving food red and was sealed with the rubber plug and the cap. 100 samples were prepared for each of the examples and comparative examples. When an operation in which a seal provided on a top surface of the cap of each of these samples is manually separated was performed, a phenomenon in which an engagement piece of the cap came off the lip was visually observed, and the number of samples in which the cap came off was counted.

(2) Sealability Evaluation Test by Pressure Resistance Test

With respect to the port-equipped bag in which the cap did not come off in the above-described test (1), the bag body thereof was placed on a horizontal plane, and a horizontal presser was brought into contact with a swelled accommodation portion, and a load of 90 kgf was continuously applied for 5 minutes, and then whether the colored water as liquid contents leaked to the outside of the bag around the rubber inner plug was visually observed and the number of bag samples in which leakage was recognized was counted.

The results of the above-described tests (1) and (2) are shown in Table 1. It has been found that in the HDPE port having high rigidity, the engagement piece is likely to come off the lip if the inclination angle is larger than 135° as in Comparative Example 1. When the pressure resistance test was performed on the port-equipped bag in which the engagement piece did not come off, no liquid leakage was observed in any of the samples.

TABLE 1

| No. | Port material | Inclination angle θ | Cap detachment number | Pressure resistance test leakage | Remark |
|---|---|---|---|---|---|
| Example 1 | HDPE | 90° | 0/100 | 0/100 | |
| Example 2 | HDPE | 105° | 0/100 | 0/100 | |
| Example 3 | HDPE | 120° | 0/100 | 0/100 | |
| Example 4 | HDPE | 135° | 0/100 | 0/100 | |
| Comparative Example 1 | HDPE | 150° | 3/100 | 0/97 | Intersection angle insufficiency |
| Comparative Example 2 | LLDPE | 90° | 1/100 | 1/99 | Rigidity insufficiency |
| Comparative Example 3 | LLDPE | 105° | 3/100 | 2/95 | Rigidity insufficiency |
| Comparative Example 4 | LLDPE | 120° | 2/100 | 0/90 | Rigidity insufficiency |
| Comparative Example 5 | LLDPE | 135° | 4/100 | 1/91 | Rigidity insufficiency |
| Comparative Example 6 | LLDPE | 150° | 6/100 | 1/88 | Rigidity insufficiency |

On the other hand, in the bags of Comparative Examples 2 to 6 in which the port molded with LLDPE having low rigidity was welded, cap detachment occurred even in a case in which the inclination angle was small. This is because the port molding material is flexible, and thus the force applied during a lid removing operation deforms the lip, resulting in insufficient locking. In addition, when the pressure resistance test was performed, liquid leakage was partially observed. Although the cap was not detached, it was presumed that compression of the rubber plug was insufficient due to the deformation of the lip and the liquid plugging performance was insufficient due to the pressure inside a pouch. However, it seems that the problem of insufficient rigidity may be solved by changing dimensions of the lip.

INDUSTRIAL APPLICABILITY

The port-equipped bag and the cap-equipped bag according to the present invention can be used without hindering sterilization work even in an aseptic environment, for example, because a special apparatus for attaching the cap is not necessary and cap attachment is easy, and are highly reliable in terms of maintaining an aseptic state because the cap is securely fixed to the lip by elasticity of the engagement piece after being attached. Therefore, the port-equipped bag and the cap-equipped bag according to the present invention have industrial applicability.

| REFERENCE SIGNS LIST | |
|---|---|
| 1 Port-equipped bag | 2 Port member |
| 3 Bag body | 4 Cap |
| 10 Seal portion | 12 Accommodation portion |
| 14 Opening | 16 Hole |
| 18 Non-seal portion | 20 Non-seal portion |
| 22 Grip portion | 24 Flange |
| 25 Attaching target portion | 26 Lip |
| 26A Engagement surface | 26B Tip end surface |
| 28 Cap body | 30 Seal |
| 32 Engagement piece | 32A Tip end portion |
| 32B Base portion | 33 Skirt portion |
| 34 Top plate portion | 36 Peripheral wall portion |
| 38 Skirt portion | 40 Top plate portion |
| 42 Connecting portion | 44 Opening |
| 46 Recess | 48 Opening |
| 50 Inner plug | 50A Disc-shaped portion |
| 50B Convex portion | 52 Concave portion |

What is claimed is:

1. A port-equipped bag comprising:

a bag body that is formed in a bag shape with a sheet and has an accommodation portion therein; and a cylindrical port member that is attached to the bag body and has one end communicating with the accommodation portion and the other end at which an opening exposed outside the bag is formed, wherein an inner plug and a cap for pressing the inner plug are attachable to the port member, the port member includes an attaching target portion that is covered by the cap in a case in which the cap is attached to the port member and an annular lip that is formed at a peripheral edge of the opening and protrudes outward from the port member, the lip has an annular engagement surface facing the bag body, and the engagement surface has an angle of 45° to less than 90° with respect to an outer peripheral surface of the attaching target portion in a cross section in an axial direction of the attaching target portion and the engagement surface is in an overhung state a tensile elastic modulus of the sheet is 550 MPa to 1500 MPa, a thickness of the sheet is 250 μm to 400 μm, a product (M×T) of the tensile elastic modulus M (MPa) and the sheet thickness T (μm) of the sheet is 137,500 or more and 300,000 or less, the port member is formed of a synthetic resin having a bending elastic modulus of 140 MPa or more and 2000 MPa or less.

2. A cap-equipped bag comprising:

the port-equipped bag according to claim 1; and an inner plug and a cap for pressing the inner plug that are attachable to the port member, wherein the cap includes a top plate portion, a cylindrical skirt portion that stands upright from a periphery of the top plate portion to be able to cover the attaching target portion, and a plurality of engagement pieces provided at a lower end portion of an inner surface of the skirt portion, the engagement piece has a tip end portion that protrudes toward the top plate portion and is elastically accessible to an inner peripheral surface of the skirt portion, and in a case in which the cap is attached to the port member, the tip end portion of the engagement piece comes into contact with the engagement surface of the lip to be engageable with the engagement surface.

3. The cap-equipped bag according to claim 2, wherein an opening is formed in the top plate portion of the cap, and a seal that closes the opening is detachably fixed to the top plate portion, so that the opening can be exposed by detaching the seal.

4. The cap-equipped bag according to claim 2, wherein the accommodation portion of the bag body is aseptically filled with contents containing at least one selected from the group consisting of plasma fractionated preparations, enzymes, blood coagulation fibrinolytic system factors, hormones, vaccines, interferons, erythropoietins, cytokines, antibodies, and fusion proteins, and the cap is attached to the port member to seal the contents.

5. The cap-equipped bag according to claim 2, wherein the accommodation portion of the bag body is aseptically filled with contents containing at least one of albumin preparations and globulin preparations, and the cap is attached to the port member to seal the contents.

6. The port-equipped bag according to claim 1, wherein a circle-annular flange portion having a constant width is formed on an outer peripheral surface of the port member at a constant distance from the lip, and in a case in which the cap is attached to the port member, an opening end of the cap and the flange portion face each other with a gap, and a height of the flange portion from a surface of the port member is about 30% to 150% of a height of an outer peripheral surface of the cap when the cap is attached to the port member.

7. The port-equipped bag according to claim 1, wherein the bending elastic modulus of the synthetic resin forming the port member is 140 MPa to 1,140 MPa.

* * * * *